United States Patent [19]
Beck et al.

[11] Patent Number: 5,707,671
[45] Date of Patent: Jan. 13, 1998

[54] METHOD FOR PREPARING REHYDRATABLE VEGETABLE PIECES

[75] Inventors: Roderick G. Beck, Blackfoot; John C. Kerr, Pocatello; Clayton Pratt; Pamela Bartausky, both of Blackfoot, all of Id.

[73] Assignee: Nonpareil Corporation, Blackfoot, Id.

[21] Appl. No.: 686,264

[22] Filed: Jul. 25, 1996

[51] Int. Cl.⁶ ............................ A23L 1/00; H05B 6/00
[52] U.S. Cl. ................ 426/242; 426/473; 426/523; 426/637
[58] Field of Search ................ 426/242, 473, 426/509, 510, 520, 523, 637; 219/759

[56] References Cited

U.S. PATENT DOCUMENTS

| | | | |
|---|---|---|---|
| Re. 31,982 | 9/1985 | Beck et al. | 426/637 |
| 3,634,105 | 1/1972 | Beck et al. | 426/637 |
| 3,635,729 | 1/1972 | Englar et al. | 426/302 |
| 4,073,952 | 2/1978 | Standing et al. | 426/242 |
| 4,276,314 | 6/1981 | Andersen | 426/637 |
| 4,419,375 | 12/1983 | Willard et al. | 426/637 |
| 4,810,660 | 3/1989 | Willard | 426/637 |
| 4,828,856 | 5/1989 | Willard | 426/637 |
| 5,441,758 | 8/1995 | Lewis et al. | 426/637 |
| 5,492,704 | 2/1996 | Stubbs et al. | 426/637 |

*Primary Examiner*—George Yeung
*Attorney, Agent, or Firm*—Trask, Britt & Rossa

[57] ABSTRACT

A method of processing potatoes or vegetables to dehydrated hash browns or other forms is disclosed where cooked and cooled potato slices are subjected to a second cooking time to improve flavor, texture and composition. The potato slices are further cooled to a chilled temperature which modifies the starch content of the potato so that the potato can be easily processed to smaller sizes, shapes or dimensions. When processed to a smaller size, shape or dimension, the potato material is contacted with a lubricating substance devoid of water which reduces or prevents the potato pieces from sticking together and improves the composition of the dehydrated potato pieces. The process of the present invention improves the flavor, texture and composition of the potatoes, both during the processing steps and at later rehydration. The process of the present invention also merely modifies the starch content of the potatoes without having to remove the starch and/or add the starch back in at a later time. As a result, product yields are increased.

20 Claims, 1 Drawing Sheet

METHOD FOR PREPARING REHYDRATABLE VEGETABLE PIECES

BACKGROUND

1. Field of the Invention

This invention relates to methods of processing and preparing vegetables for shelf storage and later use, and specifically relates to preparing dehydrated potatoes for later hydration and use.

2. Statement of the Art

The processing of vegetables into a dry or semi-dry form for extended shelf life or freezer life has been known and practiced for many dudes. The processing of potatoes to a dehydrated form is particularly common and has provided the availability of many potato forms or rehydratable side dishes including mashed potatoes, sliced potatoes and hash brown potatoes. Although methods vary, dehydration principally involves peeling the vegetable, cutting the vegetable to a desired size, shape or form, and subjecting the vegetable pieces to a heating and/or drying process until the vegetable pieces are in a form for packaging.

Processes for producing dehydrated vegetables, usually potatoes, are disclosed in U.S. Pat. No. 5,492,704 to Stubbs; U.S. Pat. No. 4,828,856 to Willard; U.S. Pat. No. 4,810,660 to Willard; U.S. Pat. No. Re. 31982 to Beck, et al.; U.S. Pat. No. 4,419,375 to Englar, et al.; U.S. Pat. No. 4,073,952 to Standing, et al.; and U.S. Pat. No. 3,635,729 to Dew, et al. The processes disclosed in the patents previously referenced differ in the means by which the vegetable pieces are dried. For example, some processes involve oven drying while others, for example U.S. Pat. No. 4,073,952 to Standing et al., involve microwaving to dry the vegetable pieces.

Another critical difference in methods of preparing dehydrated potato pieces is the means by which the starch content of the potatoes is processed. Conventional wisdom dictates that the starch content of the potatoes should be removed or, at least, significantly reduced in order to assure that the potato pieces don't stick together or become gummy, thereby causing clumping of the pieces in an undesirable mass. The problem of clumping is addressed, for example, in U.S. Pat. No. 5,492,704 to Stubbs, et al., which discloses the process of separating potato pieces and coating them with a dry mixture to absorb moisture and starch so that the pieces may be effectively dried by forcing air between the pieces. Similarly, U.S. Pat. No. 3,635,729 to Dew et al., discloses blanching and partially drying shredded raw potatoes and coating them with starch before dehydrating the nonagglomerated mass.

In still other patented processes, a mixture of shredded potato pieces and mashed potato material is formed into a pre-dried form for eventual dehydration. Such processes are disclosed in U.S. Pat. Nos. 4,828,856 and 4,810,660 to Willard, U.S. Pat. No. Re. 31,982 to Beck et al., and U.S. Pat. No. 4,419,375 to Englar et al. In the patent to Beck, the processing of the potato pieces accomplishes a retention of the identity of the separate pieces. The patent to Englar, et al., discloses a means of modifying the starch content of the dehydrated potato product by retrograding the starch.

Although the processes previously described produce a suitable dehydrated potato product, it would be advantageous to provide a method for producing dehydrated vegetable pieces, particularly potato pieces, where the starch content of the vegetable is more advantageously processed to produce a better tasting rehydratable product with better texture and higher product yield.

SUMMARY OF THE INVENTION

In accordance with the present invention, a method for dehydrating potato pieces for later rehydration provides an improved means of processing the potato pieces to retain the starch content, thereby producing a higher yielding product, and provides a better tasting product with improved flavor and texture. The method of the present invention can be used to process any type of root and tuber vegetable, particularly those with increased starch content, but is described herein with respect to potatoes as one exemplar means of carrying out the invention.

The processing method of the present invention generally involves processing potatoes in a manner which produces a potato pre-product with improved texture, composition and taste when compared to conventional means of processing potatoes to a dehydrated form. The processing method of the present invention also effectively modifies the starch content of the potato to produce a potato pre-product which manifests the optimal mount of cohesiveness without having to remove or add starch to the pre-product at any time during the processing method. As used herein, the term "pre-product" refers to potato material which has been processed in accordance with the method of the invention up to the point of drying.

In accordance with the invention, the outer skin or peel of the raw potato may be removed or may be left on the potato. The potato is sliced into relatively thick slices of, for example, one quarter inch to five eighths inch thickness. The potato slices are then precooked or blanched for a period of time not exceeding twenty-five minutes, and at a temperature not exceeding 165° F. The precooked slices are then cooled. The processing as thus far described is known and practiced in the art of processing potatoes to form dehydrated mashed potatoes. However, processing potatoes to the precooked and cooled stage as thus far described produces a potato product having a raw and gummy-like texture, composition and taste. The resulting rehydrated potato product processed by this known process also displays a degree of rawness and gumminess which detracts from the taste and texture of the finished product.

The method of the present invention, therefore, improves upon known processing methods by cooking the potato product a second time for a period of up to about fifteen minutes. The texture and taste of the potato pre-product improves with reduced "rawness" and reduced gumminess in the processed potato while maintaining a sufficiently firm potato material for later processing to other shapes or sizes. The resulting rehydrated potato product displays improved flavor and texture as well. In accordance with the processing method of the present invention, the twice-cooked potato product is then cooled again to a temperature of about 60° F. to about 75° F. Chilling the processed potato product to an even lower temperature modifies the composition of the starch in the potato product so that the stickiness of the potato material which results from the existence of starch in the product is reduced. Cooling may be accomplished by any means, including cool air, cold water or refrigeration. The potato pre-product may, therefore, be chilled to a temperature of at least 45° F., and most suitably to about 40° F., to effectively modify the starch composition and reduce the stickiness of the pre-product. At no time, however, is the starch content removed or increased by the addition of starch to the pre-product.

Once cooled after the second cooking procedure, the potatoes may then be processed into smaller pieces of potato material, such as shredding, to produce a desired vegetable size, shape or dimension. While being further processed to another size, shape or dimension, a lubricating substance is added to the potato pre-product to help maintain the potato material in discrete and separated pieces and to control the stickiness of the potato pieces. The lubricating substance is devoid of water, which improves the ease of drying the pre-product by limiting the stickiness of the pieces and improves the formation of potato masses, such as hash brown patties, when the product is rehydrated and cooked. Suitable lubricating substances include vegetable oils, monoglycerides, diglycerides, "Verv" (calcium-2- stearoyl lactylate), or combinations of such substances. This step of the method is unique over known processing steps in the art which use water during a shredding procedure to remove, and thereby control, the starch content and stickiness in the shredded pieces. Once removed, the starch is sometimes added back into the potatoes in conventional processing. By contrast, the method of the present invention strives to retain the starch content in the potato pieces during processing to a smaller size, shape or dimension. As a result, the rehydrated product is easier to dry and to use when rehydrated, and the product yield is significantly higher.

The potato pre-product is then dried to a dehydrated state, typically resulting in a moisture content of between 5% to 8% moisture. A dry seasoning material, such as salt, pepper, onion, garlic, cheese flavoring, sugar or combinations of any such seasoning materials, may be added to the dehydrated product prior to packaging. The packaged dehydrated potato product may later be rehydrated by the addition of a suitable mount of water. The starch content of the potato product, which was merely modified by the processing method of the present invention, acts with the water to produce vegetable matter which can easily be manipulated into any desirable form, such as patties. The taste and texture which results from the potatoes being processed by the method of the invention is markedly improved over conventionally-processed dehydrated potato products.

BRIEF DESCRIPTION OF THE FIGURE

In the FIGURE, which currently illustrates what is considered to be the best mode of carrying out the invention.

DETAILED DESCRIPTION OF THE INVENTION

Figure 1:
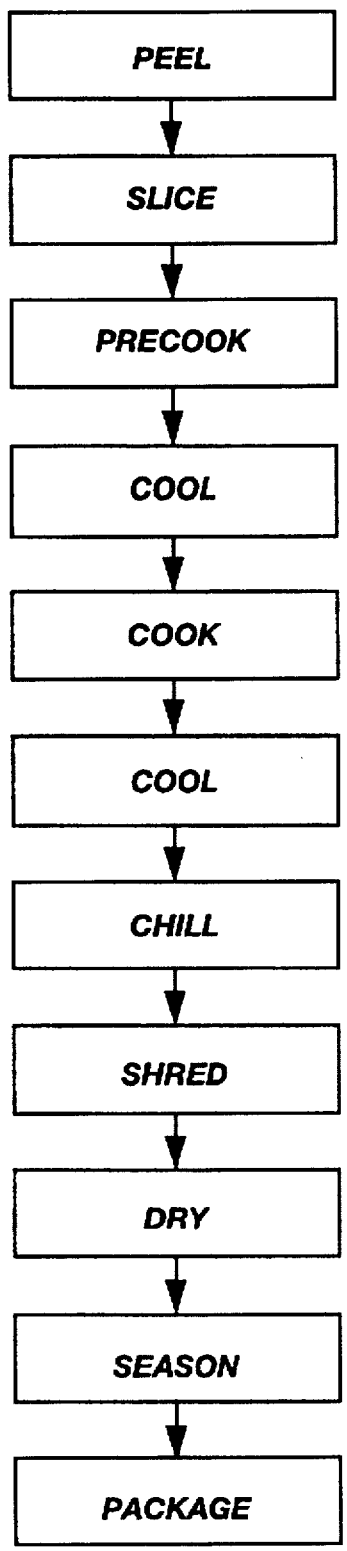
FIG. 1 is a flow diagram depicting the steps of the method of the invention.

The dehydrated vegetable processing method of the present invention is illustrated in FIG. 1. The process will be described herein with respect to processing potatoes, although the method may be used in the processing of many types of vegetables. The process begins by peeling raw, washed potatoes to remove the outer peeling. Any method of peeling may be employed, such as mechanical peeling or steam peeling. Alternatively, the potatoes may be processed with the skins left on the potatoes. The peeled or unpeeled raw potatoes may then be sliced into slabs having a thickness of between about one-quarter inch (¼") to about five eighths inch (⅝"). Again, any known means of slicing the potatoes may be employed.

The sliced raw potatoes are then precooked or blanched for a period of time to modify the starch in a manner similar to that used in processing potatoes for making flakes and granules. The precooking process may, most typically, be accomplished by heating the slices in hot water until the potato slices reach a temperature of about 150° F. to about 165° F. The precooking process may be carried out for a period of time less than about twenty-five (25) minutes. Precooking may require a period of time less than twenty-five minutes, depending on the manner of cooking, and may be accomplished in as little as ten minutes.

Following the precooking step, the potato slices are immediately cooled by, for example, subjecting the slices to a water bath where the temperature of the water is between about 60° F. to about 80° F. Other means of rapid cooling could be employed as well. The potato slices may be cooled, most suitably, for a period of ten to twenty-five minutes or until the precooking process has been stopped. Stopping the cooking process reduces the mount of free starch in the potatoes and is important in controlling the composition or condition of the starch in the potato pre-product. While the precooking step is important to producing a lightly cooked product with controlled starch content, the precooking step does not produce the optimum taste and texture in the potato pre-product.

Thus, the potato pre-product, once completely cooled, is cooked a second time to improve the taste and texture of the potatoes. The potato slices are cooked again at a temperature of between about 190° F. and about 200° F. for about five to fifteen minutes, or until the raw texture and flavor of the potatoes have been eliminated, but the potatoes are still in a substantially solid state for processing to smaller pieces (e.g., shredding). The second cooking of the potato slices may be accomplished by heating the slices in a hot water bath or by subjecting the slices to steam.

Once cooked a second time to the desired texture and taste, the potato slices are again cooled to quickly stop the cooking process. The second cooling process may be accomplished in any suitable manner, such as subjecting the hot potato slices to a cool water spray where the water temperature is about 40° F. or by subjecting the hot potato slices to flowing air the temperature of which is between about 40° F. and 90° F. The potato slices are continuously cooled until the slices reach a temperature of about 45° F. The second cooling process is important to further processing of the potato slices and is contrary to some methods of producing dehydrated mashed potatoes where the heated potatoes are mashed immediately after heating. The cooling slices may, therefore, be subjected to a further chilling process by subjecting the slices, which have been cooled to a temperature of about 60° F. to about 70° F., to, for example, a water bath the temperature of which is about 34° F. to about 38° F. Reducing the temperature of the slices to at least about 45° F. is important in order to modify the starch content to a point where stickiness is reduced enough to not impede the further processing of the slices to a smaller size, shape or dimension.

Once the potato slices are cooled to at least about 45° F., and suitably to about 40° F., the slices are further processed to a smaller size, shape or dimension, such as shredding, cubing or thinning. The slices may be processed by any known means, such as subjecting the slices to a mechanical shredding machine. While the potato slices are being processed to another size, shape or dimension, the slices are contacted with a lubricating substance which prevents the potato pieces from sticking together during and after formation. Water introduced during the processing of the potato slices to a smaller size or form is known to cause the pieces to stick together. Therefore, the potato slices should not be processed through equipment that introduces water into the potato pieces. Exemplar machines which are suitable for shredding the potato slices, for example, are a Robot Coupe manufactured by Robot Coupe USA, Inc., or an HGM Food Preparation Machine sold by Paxton Corporation. For the same reasons stated above, the lubricating substance used in processing the potato slices is devoid of water. Suitable lubricating substances include vegetable oils, monoglycerides (oil) and "Verv" (calcium-2-stearoyl lactylate), or combinations of such substances. A particularly suitable lubricating substance is a mixture, by weight, of about 8% monoglyceride oil, 13% Verv and 79% vegetable oil. The lubricating mixture is applied at a rate of about 0.5% to about 0.9% by weight of potato slices.

After the potato slices are processed to a smaller size, shape or dimension, the pieces are dried to a dehydrated form. The potato pieces may be dried to a moisture content of between about 5% and 8% moisture. Any suitable means of drying may be used, including oven drying and microwaving. Once dried, the potato pieces may be packaged in any desired form. Alternatively, the dried potato pieces may be seasoned by the addition of a dry seasoning material, or mixture of seasoning materials. Suitable seasoning materials may include salt, pepper, onion, spices, sugar, artificial or natural flavorings such as cheese, and the like.

Dehydrated potato pieces produced by the method of the present invention can be rehydrated with about 3.0 to about 3.5 parts cold or hot liquid (e.g., water) to one part dehydrated potato pieces by weight. A preferred method of rehydration may be mixing 3.3 pans of water at a temperature of between 140° F. and 160° F. to one part shredded dehydrated potato pieces. The rehydrated potatoes may then be formed into a desired shape, such as patties, and fried to produce a hash brown patty.

The processing method of the present invention produces a dehydrated potato product which has improved texture, taste and composition when rehydrated. The method of the invention advantageously makes use of the starch content of the potato rather than removing the starch and adding the starch back in during later processing. As a result, handling of the potato pieces is improved and yield of final product is increased. The method of the present invention may be used with a variety of potato and vegetable types, and can be used to process potatoes into a number of different end forms, such as dehydrated cubes, slices or shreds for making hash browns. Hence, reference herein to specific details of the illustrated embodiments is by way of example and not by way of limitation. It will be apparent to those skilled in the art that many additions, deletions and modifications to the described method of the invention may be made without departing from the spirit and scope of the invention as defined by the following claims.

What is claimed is:

1. A method of producing dehydrated potatoes for later rehydration comprising:
slicing raw, washed potatoes into multiple slices;
precooking said slices of potato to a temperature not exceeding about 165° F. for a period of time not exceeding twenty-five minutes;
cooling said precooked slices of potato to stop the precooking process;
cooking said cooled, precooked slices for a second time for a period of time sufficient to modify the starch in said slices and to increase the softness of said slices while maintaining sufficient rigidity in said slices to enable cutting of said slices;
cooling said twice-cooked slices of potato to a temperature of at least 45° F.;
further processing said cooled slices to dimensionally smaller pieces; and
drying said potato pieces.

2. The method according to claim 1 wherein said raw, washed potatoes are peeled prior to slicing.

3. The method according to claim 1 wherein said potato slices, following said second cooking and cooling steps, are cooled to at least 60° F. and then chilled to at least 45° F. prior to processing said potato slices to dimensionally smaller pieces.

4. The method according to claim 3 wherein said potato pieces are dried to a moisture content of between about 5% and about 8%.

5. The method according to claim 4 further comprising adding substantially dry seasoning material to said dried potato pieces.

6. The method according to claim 3 wherein said potato slices are cooked for the second time for a period of between five minutes and fifteen minutes.

7. The method according to claim 6 wherein said second cooking step is conducted at a temperature of between 190° F. and 200° F.

8. The method according to claim 7 wherein said second cooking step is accomplished by subjecting said potato slices to heated water.

9. The method according to claim 7 wherein said second cooking step is accomplished by subjecting said potato slices to heated steam.

10. The method according to claim 6 wherein said potato slices, following the precooking step, are cooled to a temperature of between 60° F. and 80° F.

11. The method according to claim 10 wherein said potato slices are cooled following said precooking step for a period of between ten minutes and twenty-five minutes.

12. The method according to claim 10 wherein said potato slices, following said second cooking step, are chilled to at least 45° F. by contacting said potato slices with chilled water having a temperature of between 34° F. and 38° F.

13. The method according to claim 12 wherein said potato slices are precooked for a period of between ten minutes and twenty-five minutes.

14. The method according to claim 13 wherein said potato slices are precooked at a temperature from between about 150° F. and about 160° F.

15. The method according to claim 13 wherein said potato slices are cooled by contacting said potato slices with cooled air having a temperature of between about 40° F. and about 90° F.

16. The method according to claim 13 wherein said potato slices are cooled by contacting said potato slices with cooled water.

17. The method according to claim 13 wherein said potato pieces are dried by application of microwave thereto.

18. The method according to claim 3 wherein said potato pieces are dried in a heated oven.

19. The method according to claim 3 wherein said potato pieces are dried by application of microwave thereto.

20. A method of producing dehydrated hash brown potatoes for later rehydration comprising:
peeling a raw, potato;
slicing said raw, peeled potato into multiple slices;
precooking said slices of said potato to a temperature not exceeding about 165° F. for a period of time not exceeding twenty-five minutes;
cooling said precooked slices of potato;
cooking said cooled, precooked slices for a second time for a period of less than fifteen minutes to modify the texture of said cooled, precooked slices of potato;
cooling said cooked slices of potato to a temperature between about 60° F. and about 90°;
gradually lowering the temperature of said cooled slices of potato to a temperature of at least about 45° F.;
further processing said chilled slices of potato to dimensionally smaller pieces; and
drying said potato pieces to a moisture content of between about 5% and 8% moisture.

* * * * *

UNITED STATES PATENT AND TRADEMARK OFFICE
CERTIFICATE OF CORRECTION

PATENT NO  :  5,707,671
DATED      :  January 13, 1998
INVENTOR(S):  Beck et al.

It is certified that error appears in the above-identified patent and that said Letters Patent is hereby corrected as shown below:

Column 1, line 14, change "dudes" to --decades--;
Column 2, line 19, change "mount" to --amount--;
Column 3, line 30, change "mount" to --amount--;
Column 4, line 12, change "mount" to --amount--; and
Column 5, line 22, change "pans" to --parts--.

Signed and Sealed this

Twenty-fifth Day of May, 1999

Attest:

Q. TODD DICKINSON

*Attesting Officer*     *Acting Commissioner of Patents and Trademarks*